UNITED STATES PATENT OFFICE.

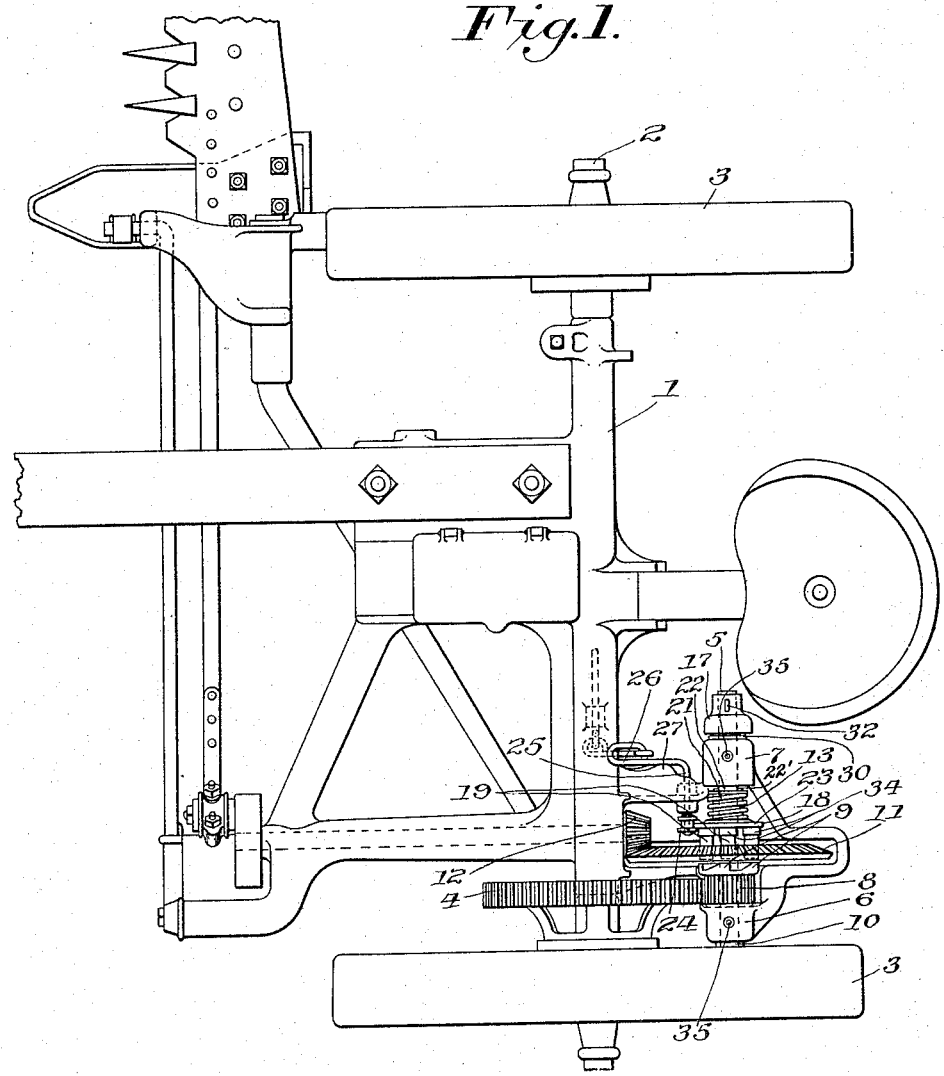

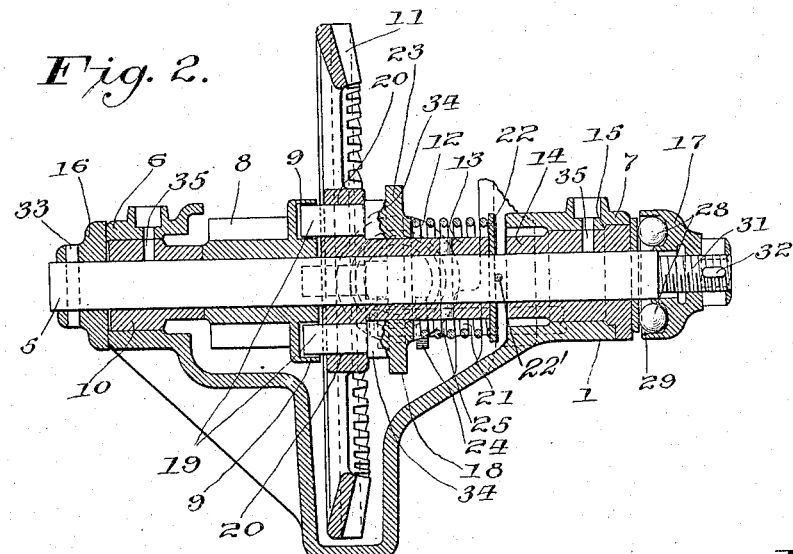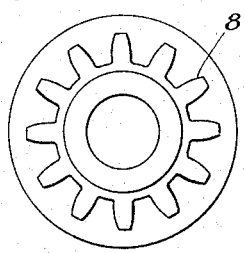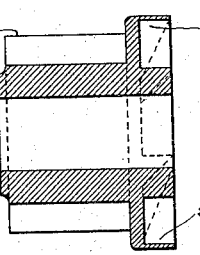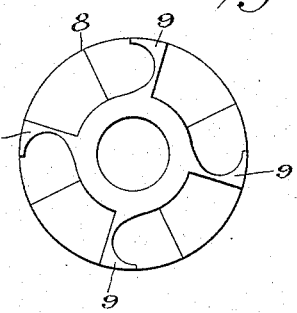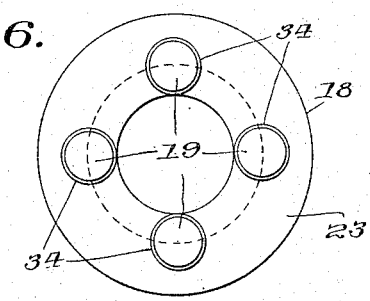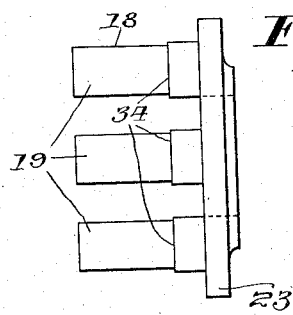

CHARLES PEARSON, OF CHICAGO, ILLINOIS, ASSIGNOR TO INTERNATIONAL HARVESTER COMPANY OF NEW JERSEY, A CORPORATION OF NEW JERSEY.

CLUTCH MECHANISM.

1,163,170. Specification of Letters Patent. Patented Dec. 7, 1915.

Application filed March 19, 1914. Serial No. 825,824.

*To all whom it may concern:*

Be it known that I, CHARLES PEARSON, a citizen of the United States, residing at Chicago, in the county of Cook and State of Illinois, have invented certain new and useful Improvements in Clutch Mechanism, of which the following is a full, clear, and exact specification.

My invention relates to clutch mechanism, and is particularly designed for use in connection with the power transmission of mowing machines, having among its objects to improve such mechanism in a manner whereby the wear upon the parts is reduced and the life of the same is increased at the same time that a positive clutching mechanism is provided.

A further object of my invention is to provide an improved clutch mechanism wherein deleterious end thrust is effectively prevented, wherein the parts are securely held in clutching position and wherein improved means are provided for adjusting the same to and from that position.

I attain these objects by providing improved clutch mechanism and improved means for engaging and disengaging the fixed and movable parts of the mechanism in a manner hereinafter described.

One embodiment of my invention is shown in the accompanying drawings, wherein—

Figure 1 is a top plan view of a mowing machine having my invention embodied in its construction; Fig. 2 is a cross section of a part of the power transmitting gear and clutch mechanism; Fig. 3 is an end view of the pinion forming part of the power transmitting gear; Fig. 4 is a longitudinal section of Fig. 3; Fig. 5 is an opposite end view of Fig. 3; Fig. 6 is an end view of the slidable clutch member; and Fig. 7 is a side elevation of Fig. 6.

The same reference characters designate like parts throughout the several views.

The main frame of the machine is designated by 1, having an axle 2 journaled thereon, upon which is mounted the carrying wheels 3, and 4 represents a spur gear secured to the axle upon the stubbleward side of the machine.

5 represents a cross shaft disposed in rear of the axle, parallel therewith and journaled in bearings 6 and 7 at the stubbleward and grassward ends thereof, respectively, and integral with the main frame 1.

8 represents the driving member of the clutch shown in the form of a pinion journaled upon the cross shaft 5, engaging with the gear 4 and having longitudinally and radially disposed clutch members or ratchet faces 9 at its grassward end, the shaft 5 being journaled at its stubbleward end in a bushing 10 carried by the frame 1.

11 represents the driven member of the clutch shown in the form of a bevel gear meshing with a pinion 12 secured to the rear end of a longitudinally disposed crank shaft journaled in the main frame 1, the gear 11 being provided at its grassward end with a sleeve member 13 whereby it is journaled upon the cross shaft 5, the grassward end of the sleeve abutting the adjacent inner end of a bushing 14 journaled in the main frame and held against a stubbleward movement by means of a shoulder 15 thereon.

16 and 17 represent end caps secured to the stubbleward and grassward ends, respectively, of the cross shaft 5 and positioning the several parts on the shaft.

18 represents a slidable clutch member mounted upon the sleeve 13 and provided with a series of longitudinally disposed cylindrical clutch pins 19 that pass through openings 20 in the hub of gear wheel 11, and are adapted to engage with the clutch members 9 of pinion 8 when the member 18 is moved in one direction, and to be disengaged therefrom when moved in an opposite direction; the slidable member 18 being normally pressed in engagement with clutch members on the pinion 8 by means of a compression spring 21 encircling the sleeve 13, and operative between a washer 22 and the member 18, the washer preferably being spaced from the end of the bearing 7 by a suitable cotter connection, 22' as shown, to prevent undue wear.

Means for shipping the clutch mechanism includes a peripheral flange 23 integral with the slidable member 18 and a double flanged roller 24 receiving the flange, the roller being journaled upon one end of a transverse rock shaft 25, that is journaled in the main frame in a manner permitting a longitudinal movement thereof. This rock shaft is provided with a crank arm 26 at its opposite end extending substantially at right angles thereto, whereby a rocking movement of the shaft may be controlled by an operator.

27 represents a cam-shaped part of the main frame 1, disposed within the path of movement of the crank arm 26 and operative to move the rock shaft 25 longitudinally in a direction to cause the roller 24 to move the slidable member 18 of the clutch mechanism in a direction to disengage it from the pinion 8 when the crank arm 26 is moved forward, and to permit it to reëngage therewith when moved in an opposite direction. It is here to be noted that the cam also acts to hold the parts in their first position noted, the arm passing over the hump on the cam, as shown in Fig. 1.

In order that the shaft 5 may rotate freely, ball bearings 28 are provided therefor between a bearing race-way 29 in the grassward end cap 17 and a washer 30 positioned on the shaft at the grassward end of the bearing 7 and the bushing 14. In order to adjust the parts to take up wear this cap is made adjustable by a thread and nut connection 31 held in position by a cotter pin 32, while the other cap may be fixed to the shaft by a pin 33. It is further to be noted that all end thrust of the clutch pins 19 against the ratchet faces 9 on the pinion 8 is prevented by the provision of shoulders 34 on the pins which engage the hub of the gear 11 and take thereon the thrust of the spring 21. Due to the provision of the washer and pin it is also to be observed that the spring 21 is maintained in the desired relation with respect to the slidable clutch member 18 at the same time that the parts are free to rotate without contact against the end bearings. Attention is further directed to the fact that the bushings 10 and 14 and the bearings 6 and 7 are provided with suitable oil holes 35 in order that they may be kept well oiled.

In the operation of the device it is to be understood that with the clutch thrown out, the pinion 8 rotates freely upon the shaft 5 and that the gear 11 remains stationary upon that shaft, the slidable clutch member 18 then being retracted by the clutch shipping mechanism and occupying the position shown in Fig. 1, the crank arm 26 of the clutch shipper being held against longitudinal movement by the cam face 27 on the mower frame and the roller 24 engaging the flange 23 as shown. When it is desired to connect the parts, the crank arm 26 is moved upward from the position shown in Fig. 1. The spring 21 is then free to force the slidable clutch member 18 toward the driving member in such a manner as to bring the clutch pins 19 into engagement with the ratchet face upon the driving member, and connect the parts for rotation.

Having shown and described a preferred embodiment of my invention, I do not wish that it be confined to the precise details of construction shown, it being understood that many changes may be made in the construction and arrangement of the associated parts of the mechanism without departing from the spirit of the invention.

What I claim as my invention, and desire to secure by Letters Patent, is:

1. In a clutch mechanism, a support, a shaft journaled thereon, a driving member rotatable on said shaft, a driven member fixed to said shaft, a spring-pressed longitudinally movable connecting member for said driving and driven members likewise carried on said shaft, said connecting member having a peripheral flange, a rocking operating member carried on said support, means for moving the same longitudinally upon a rocking movement thereof, and a roller carried on the end of said operating member and engaging the flange on said connecting member.

2. In a clutch mechanism, a support, a shaft journaled thereon, a driving member rotatable on said shaft, a driven member fixed to said shaft, a ratchet clutch face fixed to said driving member, a spring-pressed connecting member for said driving and driven member having clutch pins movable through openings in said driven member and engaging the ratchet faces on said driving member, a rocking clutch shipping member journaled on said support, and means carried on said support converting a rocking movement of said operating member into a longitudinal movement thereof and of said connecting member.

3. In a clutch mechanism, a shaft, a rotatable clutch member journaled upon said shaft and provided with clutch teeth at one end, a gear member adjacent said clutch member and provided with a sleeve whereby it is journaled upon said shaft, a spring-pressed slidable clutch member mounted upon said sleeve including a series of longitudinally disposed clutch members slidably received by openings in the hub of said gear member and adapted to engage with said clutch teeth, clutch shipping mechanism including a peripheral flange integral with said slidable clutch member, and a rock shaft movable longitudinally and engaging with said flange.

4. In a clutch mechanism, a shaft, a rotatable clutch member journaled upon said shaft and provided with clutch teeth at one end, a gear member adjacent said clutch member and provided with a sleeve whereby it is journaled upon said shaft, a spring-pressed slidable clutch member mounted upon said sleeve including a series of longitudinally disposed clutch members slidably received by openings in the hub of said gear member and adapted to engage with said clutch teeth, clutch shipping mechanism including a peripheral flange integral with said slidable clutch member, a rock shaft movable longitudinally, and a double flanged roller journaled upon said rock shaft and receiving said flange.

5. In a clutch mechanism, a frame, a shaft journaled in said frame, a rotatable clutch member journaled upon said shaft and provided with clutch teeth at one end, a gear member adjacent said clutch member and provided with a sleeve whereby it is journaled upon said shaft, a spring-pressed slidable clutch member mounted upon said sleeve including a series of longitudinally disposed clutch members slidably received by openings in the hub of said gear member and adapted to engage with said clutch teeth, clutch shipping mechanism including a rock shaft journaled in said frame and movable in a direction parallel with said shaft, a double flanged roller journaled upon one end of said rock shaft and receiving said flange, a crank arm upon the opposite end of said shaft, and a cam carried with said frame and adapted to move said shaft longitudinally when said shaft is rocked in one direction.

6. In a clutch mechanism, a support, a shaft journaled thereon, a driving member rotatable on said shaft, a driven member fixed to said shaft, a ratchet clutch face fixed to said driving member, a spring-pressed connecting member for said driving and driven members having clutch pins movable through openings in said driven member and engaging the ratchet faces on said driving member, a rocking clutch shipping member journaled on said support and longitudinally movable with respect thereto, one end of the same being operatively connected to said connecting member and the other end being provided with an angularly disposed arm, and a cam carried by said support and engageable with said arm converting a rotary movement of said arm into a longitudinal movement of said operating member and connecting member.

7. In a clutch mechanism, a support, a shaft journaled thereon, a driving member rotatable on said shaft, a driven member fixed to said shaft, a ratchet clutch face fixed to said driving member, a spring-pressed connecting member for said driving and driven members having clutch pins movable through openings in said driven member and engageable with the ratchet faces on said driving member, said connecting member also having a peripheral flange, a rocking clutch shipping member journaled on said support and longitudinally movable with respect thereto, a roller on one end thereof operatively connected to the flange on said connecting member, a laterally disposed arm carried on the opposite end of said shipping member, and a cam carried by said support and engageable with said arm during a lateral movement of the latter deflecting said arm laterally.

8. In a mower, clutch mechanism including a support, a shaft journaled thereon, a driven member fixed to said shaft having a plurality of axially extending openings therein and a sleeve portion protruding from one side thereof, a driving member rotatable on said shaft having a ratchet clutch face thereon, a connecting member for said driving and driven members slidable on said sleeve portion and having clutch pins movable through the openings in said driven member into engagement with the ratchet faces on said driving member, a spring coiled about said sleeve portion and disposed between said connecting member and an abutment on said shaft, and means for sliding said connecting member on said sleeve.

9. In a mower, a clutch mechanism including a shaft, a rotatable clutch member journaled upon said shaft and provided with clutch teeth at one end thereof, a gear member adjacent said clutch member provided with a sleeve whereby it is fixed upon said shaft and having a plurality of axially extending openings in its hub, a slidable clutch member mounted upon said sleeve including a series of longitudinally disposed clutch pins slidably received by the openings in the hub of said gear member and adapted to engage with said clutch teeth, a spring encircling said sleeve engageable at one end with said slidable member, means on said shaft forming an abutment for the opposite end of said spring, and means for preventing contact of said clutch pins with the end walls of said clutch teeth.

10. In a mower, clutch mechanism including a support having a laterally projecting cam surface thereon, a shaft journaled in said support, a driven clutch member fixed to said shaft, a driving clutch member rotatable on said shaft and connectible with said driven member, a clutch connecting member carried on said shaft and slidable with respect to said shaft to connect or disconnect said members, a rocking clutch controlling member operatively connected to said connecting member and slidable longitudinally of said shaft and frame, and means on said controlling member engageable with the cam surface on said support whereby said clutch controlling member and clutch connecting member are reciprocated to change the connection of said driving and driven members upon a rocking movement of said controlling member.

In testimony whereof I affix my signature, in the presence of two witnesses.

CHARLES PEARSON.

Witnesses:
R. W. MARTIN,
RAY PATTISON.

Copies of this patent may be obtained for five cents each, by addressing the "Commissioner of Patents, Washington, D. C."